United States Patent [19]

Naruishi et al.

[11] 4,021,598
[45] May 3, 1977

[54] ALKALINE DRY CELL

[75] Inventors: Tadayuki Naruishi, Tokyo; Youichi Kataoka; Haruyoshi Sasabe, both of Yokohama; Satoru Tutiya, Tokyo, all of Japan

[73] Assignee: Toshiba Ray-O-Vac Co., Ltd., Tokyo, Japan

[22] Filed: June 16, 1976

[21] Appl. No.: 696,622

[30] Foreign Application Priority Data

June 18, 1975 Japan .............................. 50-74146

[52] U.S. Cl. .............................. 429/206; 429/219; 429/229
[51] Int. Cl.² .......................................... H01M 6/04
[58] Field of Search ............ 429/206, 219, 229–231

[56] References Cited

UNITED STATES PATENTS

| | | | |
|---|---|---|---|
| 3,925,102 | 12/1975 | Kozawa | 429/219 X |
| 3,945,851 | 3/1976 | Nyote et al. | 429/219 X |

*Primary Examiner* — C. F. LeFevour

[57] ABSTRACT

A zinc-silver oxide dry cell comprises a zinc anode, a silver oxide cathode, an immobilized body interposed between the anode and the cathode, and a metallic silver layer formed at least on the surface of the anode side of the cathode in which the metallic silver layer is formed through a reduction reaction resulting from a light exposed to the surface of the cathode. The cathode of the dry cell requires no graphite for an electro-conductive ingredient, making it possible to increase an amount of silver oxide which is active ingredient for the cathode and to consequently increase a discharge capacity correspondingly.

4 Claims, 3 Drawing Figures

ALKALINE DRY CELL

BACKGROUND OF THE INVENTION

This invention relates to an improved alkaline dry cell comprising in combination a zinc anode, a silver oxide cathode and an alkaline electrolyte, and in particular an improvement in a cathode for the alkaline dry cell.

A conventional dry cell contains a silver oxide ($Ag_2O$) as an active ingredient. In such a conventional dry cell, a silver oxide is a poor non-conductor showing, for example, a greater resistance of about $10^8$ $\Omega cm$. For this reason, an electroconductive ingredient such as graphite is added to a silver oxide, as shown in U.S. Pat. No. 3,427,204 so as to enhance electroconductivity. In order to obtain necessary electroconductivity from the standpoint of the characteristic of the dry cell, use is generally made of a cathode obtained by compressing a composition comprising 95 parts of silver oxide, 4.5 parts of graphite and 0.5 part of a binder under a pressure of 5 to 10 ton to form a pellet or a compressed coherent mass. The use of the graphite reduces an amount of silver oxide by that extent, when viewed based on the whole weight of the composition, resulting in a decreased discharge capacity. Therefore, difficulty is encountered in attaining high performance of a compact button type cell of closed variety in particular. Graphite shows a resistance of about $10^{-2}$ $\Omega cm$. Since a great difference of resistance is observed between the graphite and the silver oxide, it is necessary to form a pellet by uniformly mixing each ingredient of the composition and compressing the mixture under a pressure. In actual practice, however, many difficulties are involved, since the graphite is smaller in true specific gravity than the silver oxide.

SUMMARY OF THE INVENTION

An object of this invention is to provide a zinc-silver oxide dry cell having a great discharge capacity.

Another object of this invention is to provide an alkaline dry cell including a silver oxide cathode depolarizer pellet of good conductivity and having no electroconductive ingredient such as graphite.

Another object of this invention is to provide a method for easily imparting an electroconductivity to a cathode pellet without lowering a discharge capacity.

According to this invention there is provided an alkaline primary cell comprising an anode containing zinc as an active ingredient, a cathode containing a silver oxide as an active ingredient, an immobilized body of an alkaline electrolyte interposed between the anode and the cathode, and a metallic silver layer formed at least on the surface of anode side of the cathode. The metallic silver layer is formed through a photochemical reaction resulting from the reduction of the silver oxide by a light. That is, the metallic silver layer is formed at least on the surface of the anode side of the cathode by irradiation with a light having a wavelength of 1 to 700 nm, preferably 300 to 400 nm.

DETAIL DESCRIPTION OF THE PREFERRED EMBODIMENT

An alkaline dry cell according to this invention will be explained below by referring to FIG. 1.

Figure 1:
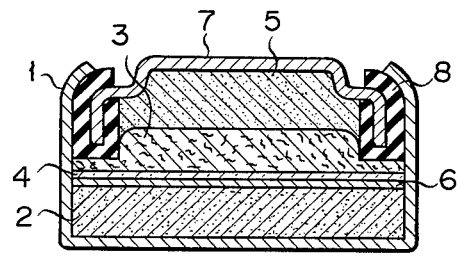
FIG. 1 is a cross-sectional view showing an alkaline primary cell according to one embodiment of this invention.

In FIG. 1, 1 shows a cup-like cathode vessel made of a nickel-plated iron plate. Within the cathode vessel 1 is formed a cathode pellet 2 which is formed by charging a mixture of 99.5 parts by weight of a silver oxide as an active ingredient and 0.5 parts of a polystyrene resin as a binder into the cathode vessel 1 and compressing it. An immobilized body 3 made of a nonwoven polyamide fiber cloth impregnated with an electrolyte of an aqueous potassium hydroxide solution is formed through a cellophane separator 4 on the cathode pellet 2 and a gelatinized zinc anode 5 is formed on the immobilized body 3. A metallic silver layer 6 is formed at least on that surface of the cathode pellet 2 where it contacts with the cellophane separator 4. The metallic silver layer 6 is formed by irradiating the outer surface of the cathode pellet 2 for about 10 to 15 minutes with an ultraviolet ray with a wavelength of 300 to 400 nm using an ultraviolet lamp. 7 shows an anode cap made of a steel plate and having a nickel-plated outer surface and a tin-or copper-plated inner surface. The anode cap 7 is sealed by a sealing gasket 8 made of polyamide.

An alkaline dry cell using, instead of such a silver layer bearing cathode pellet 2, a conventional cathode pellet made of a silver oxide, graphite and binder is substantially the same as an alkaline dry cell of 11.6 mm in diameter and 5.4 mm in height which is called G13 type under the Japanese Industrial Standard (JIS).

The following Table indicates a comparison in properties between the alkaline dry cell according to this invention (FIG. 1) and a conventional alkaline dry cell in which a cathode pellet contains graphite and has no metallic silver at the surface.

Table

| Comparison item | | This invention (A) | prior art (B) |
|---|---|---|---|
| Composition of cathode pellet | silver oxide | 99.5 parts | 95 parts |
| | electroconductive ingredient (graphite) | 0 | 4.5 parts |
| | binder (polystyrene resin) | 0.5 part | 0.5 part |
| Weight of cathode pellet | | 1.2 g | 1.0 g |
| Weight of silver oxide in cathode pellet composition | | 1.194 g | 0.95 g |
| Theoretical electrical capacity | | 275.8 mAH | 219.5 mAH |
| Electrical resistance from the top surface of the cathode pellet up to the outer surface of the cathode vessel* | | 6 to 8 $\Omega$ | 8 to 10 $\Omega$ |
| Open circuit voltage | | 1.58 V | 1.58 V |
| Short-circuit current | | 0.71 A | 0.64 A |
| Impedance (1K.Z AC frequence) | | 2.0 $\Omega$ | 2.3 $\Omega$ |
| Discharge capacity (Total End Voltage 1.2 V | 20° C 5000$\Omega$continuous discharge | 253 mAH | 191 mAH |
| | 20° C 500 $\Omega$continuous discharge | 201 MAH | 155 mAH |
| | 20° C 150 $\Omega$continuous discharge | 175 mAH | 140mAH |

*A nickel-plated steel rod with a diameter of 3 mm was contacted under a pressure of 5 kg/cm² with the central top surface portion of a cathode pellet with a diameter of 11 mm and a thickness of 2 mm and electrical resistance between the bottom of a cathode vessel and the steel rod was measured using a DC resistance meter.

As will be evident from the Table, the cathode pellet of this invention shows a smaller electrical resistance than that in the conventional alkaline dry cell and, in consequence, the electroconductivity is excellent. It is also evident that, as compared with the conventional alkaline dry cell, the alkaline dry cell of this invention provides increased short-circuit current and increased discharge capacity of about 25 to 30%.

Figure 2:
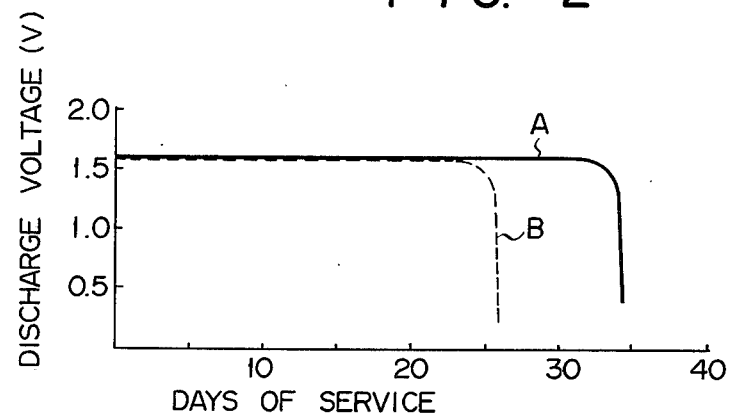
FIGS. 2 and 3 are characteristic curves each showing a comparison in discharge characteristic between a zinc-silver oxide cell according to this invention and a conventional counterpart.
Figure 3:
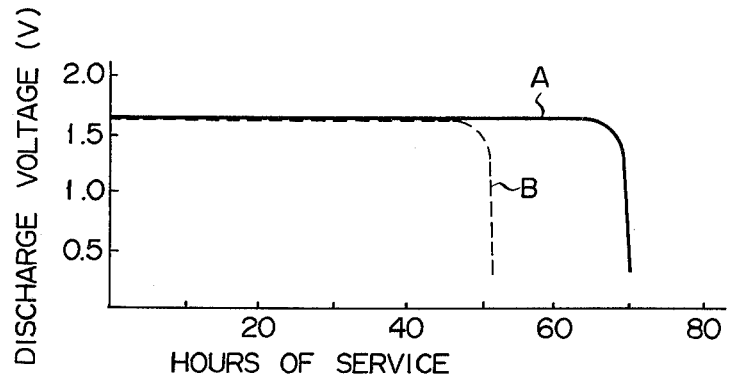

FIGS. 2 and 3 show a comparison in discharge characteristics between the alkaline dry cell (A) of this invention and that (B) of the conventional alkaline dry cell (see Table). FIG. 2 shows a continuous discharge at a temperature of 20° C and a resistance of 5000 Ω and FIG. 3 shows a continuous discharge at a temperature of 20° C and a resistance of 500 Ω. From these Figures it will appreciated that the alkaline dry cell of this invention exhibits excellent discharge characteristics in comparison with the conventional counterpart. Since according to this invention the metallic silver layer formed by irradiating with a light at least the surface of the anode side of the cathode pellet serves as an electroconductive ingredient, it is unnecessary to add graphite to the silver oxide as with the case with the conventional cathode pellet. This makes it possible to increase an amount of silver oxide, which is an active ingredient for the cathode, as compared with that required in the prior art. As a result, the discharge capacity can be correspondingly increased according to this invention.

What we claim is:
1. An alkaline dry cell comprising:
   an anode containing zinc as an active ingredient;
   a cathode containing a silver oxide as an active ingredient;
   an immobilized body of an alkaline electrolyte interposed between said anode and said cathode; and
   a metallic silver layer formed at least on the surface of the anode side of said cathode by reduction of the silver oxide through a photochemical reaction.
2. An alkaline dry cell according to claim 1, in which said metallic silver layer is formed by irradiating the surface of the cathode with a light having a wavelength of 1 to 700 nm.
3. An alkaline dry cell according to claim 1, in which said metallic silver layer is formed by irradiating the surface of the cathode with a light having a wavelength of 300 to 400 nm.
4. An alkaline dry cell according to claim 1, in which said cathode contains no graphite for an electroconductive ingredient.

* * * * *